(12) United States Patent
Brantley et al.

(10) Patent No.: US 10,596,852 B2
(45) Date of Patent: Mar. 24, 2020

(54) WHEEL ASSEMBLY FOR TRANSPORTABLE CARTON

(71) Applicant: WestRock Shared Services, LLC, Atlanta, GA (US)

(72) Inventors: Matilda D. Brantley, Marietta, GA (US); Josh L. Reece, Booneville, MS (US); Rein Stolz, Redding, CA (US); Dale West, Tupelo, MS (US)

(73) Assignee: WestRock Shared Services, LLC, Atlanta, GA (US)

( * ) Notice: Subject to any disclaimer, the term of this patent is extended or adjusted under 35 U.S.C. 154(b) by 0 days.

(21) Appl. No.: 16/357,487

(22) Filed: Mar. 19, 2019

(65) Prior Publication Data

US 2019/0381830 A1 Dec. 19, 2019

Related U.S. Application Data

(63) Continuation of application No. 16/011,096, filed on Jun. 18, 2018.

(51) Int. Cl.
*B62B 1/16* (2006.01)
*B60B 33/00* (2006.01)
*B65B 51/06* (2006.01)

(52) U.S. Cl.
CPC ...... *B60B 33/0023* (2013.01); *B60B 33/0026* (2013.01); *B60B 33/0028* (2013.01); *B60B 33/0042* (2013.01); *B60B 33/0063* (2013.01); *B62B 1/16* (2013.01); *B65B 51/067* (2013.01)

(58) Field of Classification Search
CPC .... B62B 1/10; B62B 1/16; B62B 1/26; B62B 1/268; B62B 5/0093; B62B 5/0083; A45C 5/14; A45C 5/141; A45C 5/143
USPC ..................... 280/79.11, 79.2, 79.7
See application file for complete search history.

(56) References Cited

U.S. PATENT DOCUMENTS

| | | | | |
|---|---|---|---|---|
| 3,418,005 A | * | 12/1968 | Allina | B62B 1/08 280/47.26 |
| 3,837,666 A | * | 9/1974 | Hodson | B62B 5/0083 280/47.131 |
| 4,596,397 A | * | 6/1986 | Conti | A45C 13/385 16/18 CG |
| 4,630,838 A | * | 12/1986 | Stockton | B62B 3/108 280/47.17 |
| 5,125,675 A | * | 6/1992 | Engelbrecht | B62B 1/12 229/164 |
| 5,181,731 A | * | 1/1993 | Gustavsen | B62B 1/26 280/35 |
| 5,244,219 A | * | 9/1993 | Hadlum | B62B 1/12 280/47.26 |
| 5,277,449 A | * | 1/1994 | Schmidt | A45C 13/385 280/47.26 |

(Continued)

*Primary Examiner* — Jeffrey J Restifo
(74) *Attorney, Agent, or Firm* — WestRock IP Legal (57) ABSTRACT

A transportable carton assembly is disclosed that includes a carton defining a bottom rear corner edge portion having a pair of longitudinally spaced apart apertures formed therein, and an elongated shield retained within the bottom rear corner edge portion of the carton and including a pair of longitudinally spaced apart wheels positioned to extend through the longitudinally spaced apart apertures formed in the bottom rear corner edge portion of the carton for transporting the carton over a surface.

10 Claims, 12 Drawing Sheets

(56) References Cited

U.S. PATENT DOCUMENTS

| | | | | |
|---|---|---|---|---|
| 5,370,409 | A * | 12/1994 | Latouche | B62B 1/26 16/113.1 |
| 5,575,361 | A * | 11/1996 | Chou | A45C 5/14 16/18 R |
| 5,711,438 | A * | 1/1998 | Smith | A47F 5/116 211/149 |
| 5,743,542 | A * | 4/1998 | Mast | B65F 1/1473 280/43 |
| 5,918,710 | A * | 7/1999 | Sher | A45C 5/14 16/110.1 |
| D421,326 | S * | 2/2000 | Lewis | D20/19 |
| 6,036,203 | A * | 3/2000 | Tyus | B25H 3/00 280/47.26 |
| 6,039,243 | A * | 3/2000 | Lickton | A45C 7/0036 229/117.01 |
| 6,193,324 | B1 * | 2/2001 | Chang | A45C 5/14 190/18 A |
| 6,231,130 | B1 * | 5/2001 | Chang | A45C 5/14 190/18 A |
| 6,279,926 | B1 * | 8/2001 | Taube | B62B 5/0083 280/37 |
| 6,374,969 | B1 * | 4/2002 | Young | A45C 5/14 190/18 A |
| 6,513,816 | B1 * | 2/2003 | Kijima | B62B 5/0083 280/47.26 |
| 6,547,263 | B1 * | 4/2003 | McGeorge | B62B 1/12 229/101.2 |
| 6,955,365 | B2 * | 10/2005 | Giampavolo | B62B 1/12 229/117.09 |
| 6,961,976 | B2 * | 11/2005 | Kuo | A45C 5/145 16/18 R |
| 7,207,578 | B2 * | 4/2007 | Shore | B62B 3/108 280/47.34 |
| 7,229,081 | B2 * | 6/2007 | Stockler | B62B 1/14 280/47.24 |
| 7,252,295 | B2 * | 8/2007 | Bludworth | B62B 1/183 280/33.991 |
| 7,281,720 | B1 * | 10/2007 | Richards | B62B 3/104 280/79.11 |
| 7,284,942 | B1 * | 10/2007 | Allen | B62H 3/08 280/79.11 |
| 7,325,816 | B2 * | 2/2008 | Johnson | B60S 13/00 211/20 |
| 7,331,454 | B2 * | 2/2008 | Godshaw | A45C 5/14 190/117 |
| 7,383,612 | B2 * | 6/2008 | Bushey | B60B 33/0005 16/18 R |
| 7,726,671 | B2 * | 6/2010 | Musi | B65D 31/10 280/37 |
| 7,762,566 | B2 * | 7/2010 | Wang | B62B 5/0083 280/651 |
| 7,874,562 | B2 * | 1/2011 | Fitzgerald | A47F 10/04 280/47.34 |
| 7,896,367 | B1 * | 3/2011 | Suprono | B62B 5/0083 280/47.15 |
| 8,162,329 | B1 * | 4/2012 | Openshaw | B62B 5/0083 280/47.131 |
| 8,191,908 | B2 * | 6/2012 | Udall | A45C 5/14 280/47.26 |
| 8,413,775 | B2 * | 4/2013 | Tong | A45C 5/14 190/107 |
| 8,955,857 | B1 * | 2/2015 | Kunkel | B62B 3/104 280/47.34 |
| 9,566,991 | B2 * | 2/2017 | Parker | B62B 1/12 |
| 9,834,037 | B2 * | 12/2017 | Carter | B60B 7/0013 |
| 9,845,125 | B1 * | 12/2017 | Liu | B62B 3/00 |
| 10,173,466 | B2 * | 1/2019 | Carter | B60B 19/12 |
| 10,322,735 | B2 * | 6/2019 | Parker | B62B 1/26 |

\* cited by examiner

WHEEL ASSEMBLY FOR TRANSPORTABLE CARTON

CROSS-REFERENCE TO RELATED APPLICATION

This application is a continuation application of U.S. patent application Ser. No. 16/011,096 filed Jun. 18, 2018 which is entitled "Wheel Assembly For Transportable Carton", the contents of which is incorporated herein by reference in its entirety.

BACKGROUND OF THE INVENTION

1. Field of the Invention

The subject invention is directed to product packaging, and more particularly, to a wheel assembly for large format cartons, such as transportable mattress cartons or the like, and also to a transportable carton having a wheel assembly, as well as a method of constructing such a carton.

2. Description of Related Art

The retail sale of mattresses is a thriving business. When a customer purchases a mattress at a retail store, it can be difficult for the customer to transport the mattress home in their own vehicle due to the size and weight of the mattress. And, scheduling a delivery to a customer's home can be time consuming and costly, acting as an impediment to a sale. Recently, retail mattress stores have been selling mattresses to customers that are packaged in a cardboard box in a compressed and rolled state. These mattresses are relatively heavy and the boxes in which they are packaged are often difficult to move.

A carton designed for transporting a mattress in a compressed and rolled state is disclosed in U.S. Pat. No. 8,365,911 to Oh. This carton includes a pair of fixed-axis wheels that are individually fastened to a pair of rigid strip members, each of which is secured to a corner edge surface of a bottom portion of the carton. Because there are several individual component parts, this particular carton is relatively difficult to manufacture and assemble in a cost effective manner. It would be beneficial therefore, to design a transportable mattress carton with fewer component parts that can be easily manufactured and assembled in a cost effective manner.

SUMMARY OF THE DISCLOSURE

The subject invention is directed to a new and useful wheel assembly for a large format transportable corrugated cardboard carton, for example, a carton for transporting a mattress in a compressed and rolled state. More particularly, the subject invention is directed to a unique wheel assembly that is adapted and configured to be efficiently installed and integrated into the bottom rear corner edge portion of a transportable mattress carton so that it can be easily rolled over a surface.

The wheel assembly of the subject invention includes an elongated injection molded thermoplastic shield having a planar base portion that defines upper and lower surfaces, opposed front and rear edges, opposed side edges and a central axis. Support flanges extend upwardly from the opposed front and rear edges of the base portion at opposed angles to one another relative to the upper surface of the base portion, and each support flange has a respective interior and exterior surface.

Preferably, each of the support flanges of the shield extends upwardly from the opposed front and rear edges of the base portion at an angle of about between 40 to 45 degrees relative to the upper surface of the base portion. The support flanges of the shield include a front support flange that extends upwardly at an angle from the front edge of the base portion and a rear support flange that extends upwardly at angle from the rear edge of the base portion. Preferably, the front support flange is wider than the rear support flange to facilitate installation in the carton.

The shield further includes a pair of longitudinally spaced apart wheel wells, each of which is adapted and configured to accommodate a respective wheel mounted on an axle. Each wheel well has an arcuate wheel housing associated therewith that extends between the respective interior surfaces of the support flanges. Each wheel well has an elongated axle channel associated therewith, which is formed in the base portion aligned with the central axis thereof. Each axle channel opens through the lower surface of the base portion, and includes an enclosed hub area projecting upwardly from the upper surface of the base portion.

Struts extend outwardly from the exterior surfaces of each support flange along peripheral edges of the wheel wells to protect the wheels, and opposed side walls extend from side edges of the interior surfaces of each support flange and from the upper surface the base portion along the side edges thereof to inhibit movement of the wheel assembly within the carton. Preferably, the lower surface of the base portion of the shield and the exterior surface of rear support flange of the shield include a plurality of spaced apart outwardly projecting rounded nubs for engaging adjacent surfaces of the carton to prevent the wheel assembly from shifting in the carton.

The subject invention is also directed to a transportable carton assembly, which comprises a corrugated cardboard carton defining a bottom rear corner edge portion having a pair of longitudinally spaced apart apertures formed therein, and an elongated shield retained within the bottom rear corner edge portion of the carton and including a pair of longitudinally spaced apart wheels positioned to extend through the longitudinally spaced apart apertures formed in the bottom rear corner edge portion of the carton for transporting the carton over a surface.

Preferably, the elongated shield has a planar base portion with opposed front and rear edges, and a pair of support flanges extending upwardly from the opposed front and rear edges of the base portion at opposed angles to one another relative to the base portion. The support flanges include a front support flange extending upwardly from the front edge of the base portion and a rear support flange extending upwardly from the rear edge of the base portion.

In an installed condition, an exterior surface of the rear support flange is positioned against an interior surface of a rear panel of the carton, and an interior surface of the front support flange is positioned against an exterior surface of a first bottom panel of the carton. Also, an exterior surface of the front support flange is positioned against an interior surface of a second bottom panel of the carton, and an interior surface of a third bottom panel of the carton is positioned against an exterior surface of the second bottom panel of the carton, so as to retain the shield within the bottom rear corner edge portion of the carton.

The subject invention is also directed to a method of constructing a transportable carton assembly, which includes the steps of: providing a corrugated cardboard carton defining a bottom rear corner edge portion having a pair of longitudinally spaced apart apertures formed therein; providing an elongated thermoplastic shield having front and rear support flanges extending upwardly from opposed front and rear edges of a base portion at opposed angles to one another relative to the base portion and including a pair of longitudinally spaced apart wheels; and retaining the shield within the bottom rear corner edge portion of the carton so that the spaced apart wheels of the shield extend through the spaced apart apertures in the bottom rear corner edge portion of the carton.

The step of retaining the elongated shield within the bottom rear corner edge portion of the carton includes positioning an exterior surface of the rear support flange against an interior surface of a rear panel of the carton, and positioning an interior surface of the front support flange against an exterior surface of a first bottom panel of the carton. The method further includes the step of folding a second bottom panel of the carton over an exterior surface of the front support flange and the first bottom panel of the carton, and then folding a third bottom panel of the carton over an exterior surface of the second bottom panel of the carton, to retain the shield within the bottom rear corner edge portion of the carton.

These and other features of the disclosed transportable mattress carton and the wheel assembly therefor will become more readily apparent to those having ordinary skill in the art to which the subject invention appertains from the detailed description of the preferred embodiments taken in conjunction with the following brief description of the drawings.

BRIEF DESCRIPTION OF THE DRAWINGS

So that those skilled in the art will readily understand how to make and use the wheel assembly and transportable carton of the subject invention without undue experimentation, preferred embodiments thereof will be described in detail herein below with reference to the figures wherein:

FIG. 1 is a bottom or exterior perspective view of a preferred embodiment of the wheel assembly of the subject invention, which is adapted and configured to be installed in the bottom corner edge portion of a transportable mattress carton or the like;

DETAILED DESCRIPTION OF THE PREFERRED EMBODIMENTS

Figure 1:
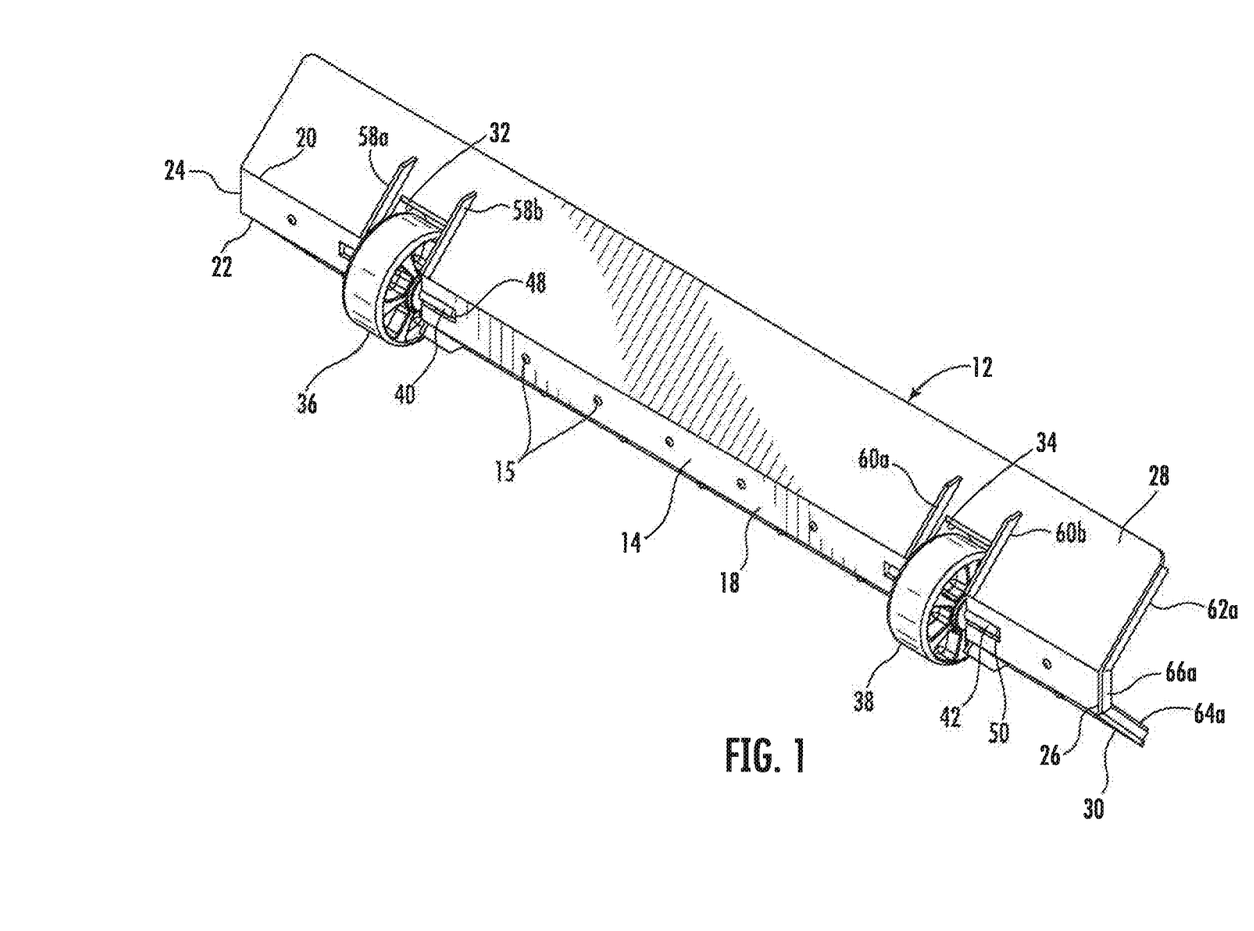

Referring now to the drawings wherein like reference numerals identify similar structural elements and features of the subject invention, there is illustrated in FIG. 1 a wheel assembly for a transportable carton, which is designated generally by reference numeral 10. As discussed in more detail below, the wheel assembly 10 is adapted and configured to be installed in the bottom rear corner edge portion of a large format transportable corrugated cardboard carton, such as a cardboard mattress carton or the like, as best seen in FIGS. 8 through 11.

Referring now to FIGS. 1 through 7, the wheel assembly 10 of the subject invention includes an elongated injection molded thermoplastic shield 12, which can be formed from such materials as High-Density Polyethylene (HDPE) or Polypropylene (PP). The shield 12 of wheel assembly 10 has a planar base portion 14 that defines upper and lower surfaces 16 and 18, opposed front and rear edges 20 and 22, and opposed side edges 24 and 26.

Front and rear support flanges 28 and 30 extend upwardly from the opposed front and rear edges 20 and 22 of the base portion 14, respectively, at opposed angles to one another relative to the upper surface 16 of the base portion 14. More particularly, the front and rear support flanges 28 and 30 of the shield 12 both extend upwardly from the opposed front and rear edges 20 and 22 of the base portion 14 at an angle α of about between 40 to 45 degrees, relative to the upper surface 16 of the base portion 12.

Figure 6:
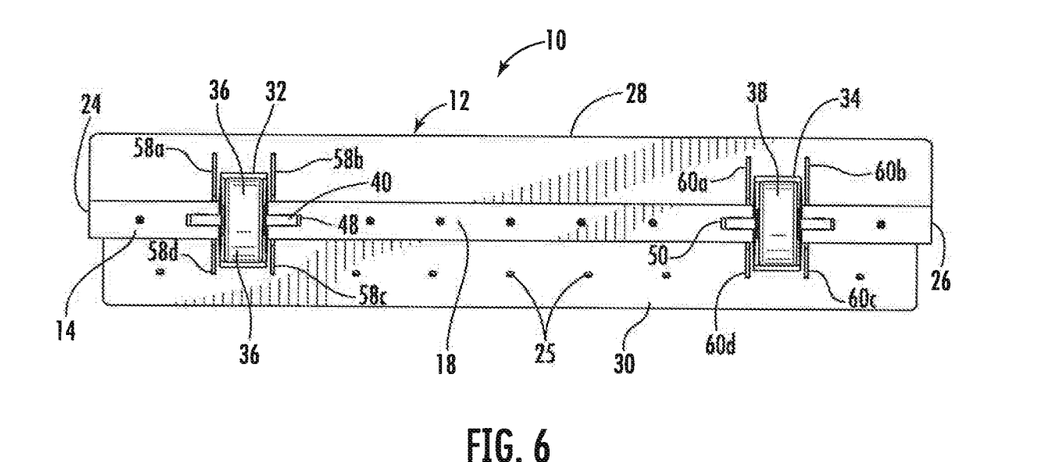
FIG. 6 is a top plan view of the wheel assembly of FIG. 1.

The front support flange 28 of shield 12 has opposed interior and exterior surfaces 28a and 28b, and the rear support flange 30 of shield 12 has opposed interior and exterior surfaces 30a and 30b. As best seen in FIG. 6, the rear support flange 30 is narrower than the front support flange 28, in order to facilitate proper installation of the wheel assembly 10 in the bottom corner edge portion a carton, as discussed in more detail below, with respect to FIG. 9.

Figure 2:
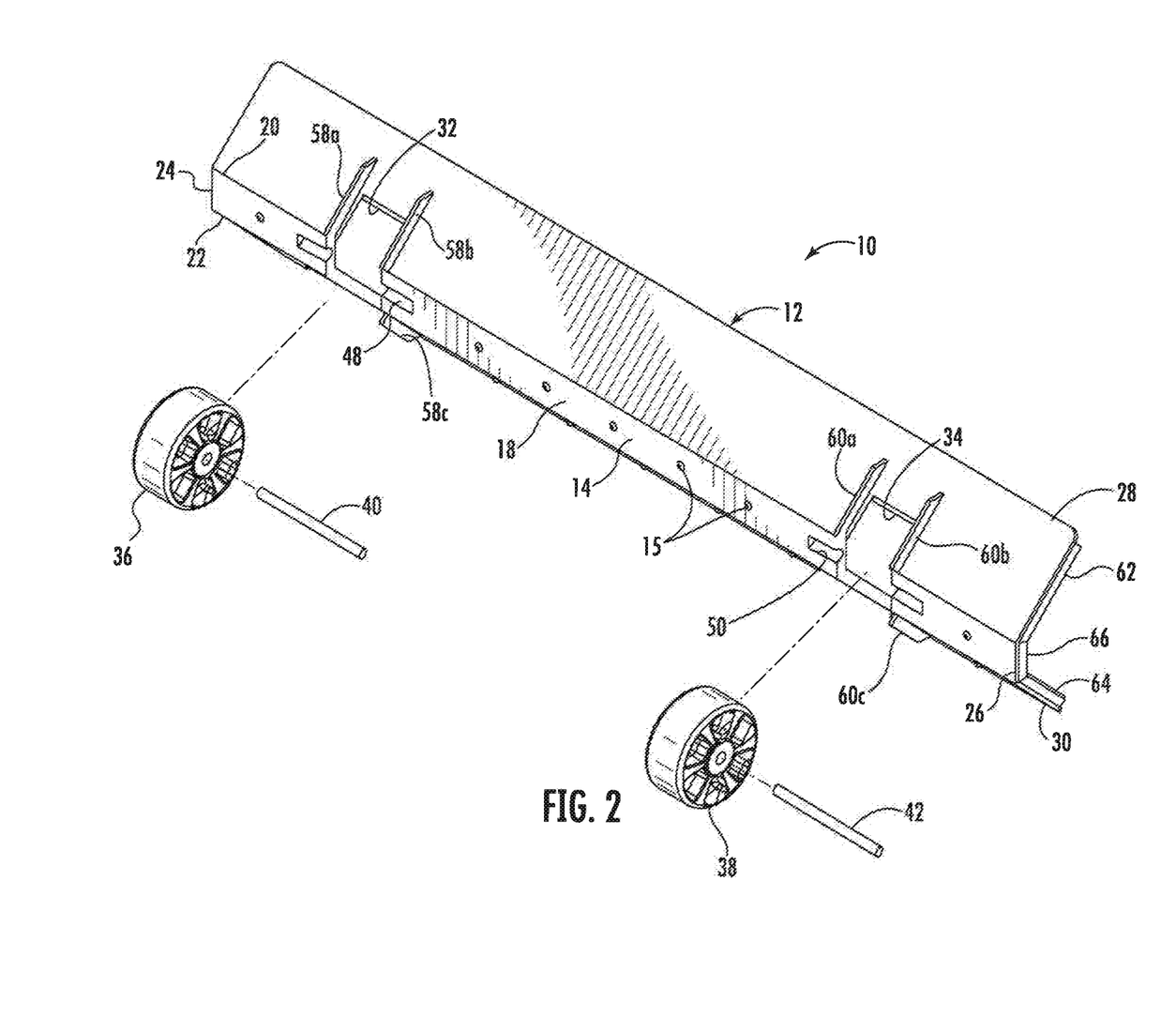
FIG. 2 is an exploded perspective view of the wheel assembly shown in FIG. 1, with parts separated for ease of illustration.

As best seen in FIG. 2, the shield 12 includes a pair of longitudinally spaced apart wheel wells 32 and 34, each of which is adapted and configured to accommodate a respective wheel 36 and 38 mounted on axles 40 and 42. The wheels 36 and 38 are preferably formed from a durable plastic material and the axles 40 and 42 are preferably formed from metal rod stock.

Figure 7:
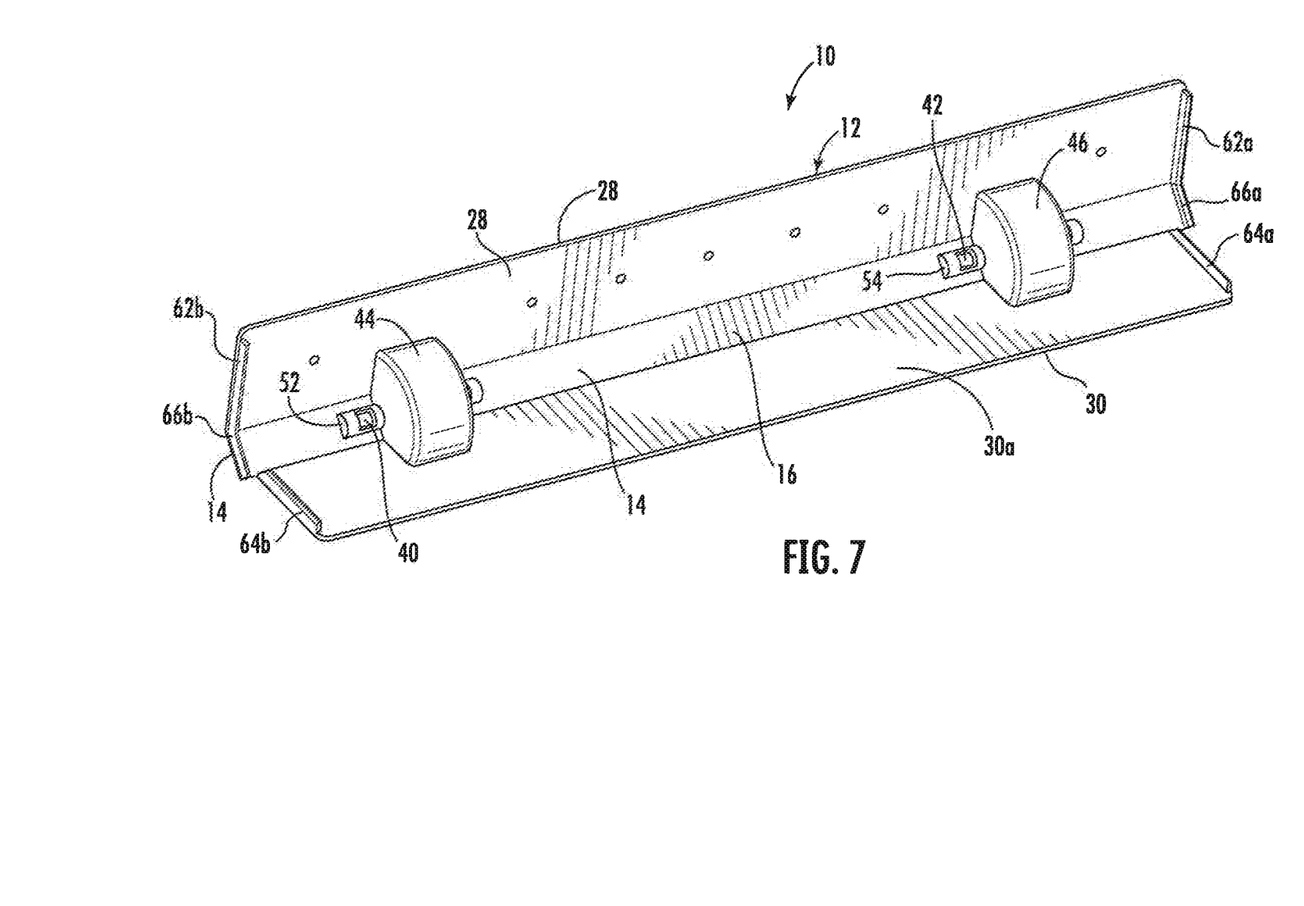
FIG. 7 is a top or interior perspective view of the wheel assembly of FIG. 1.

Each wheel well 32, 34 has an arcuate wheel housing 44, 46 extending between the respective interior surfaces 28a and 30a of the front and rear support flanges 28 and 30, which is best seen in FIG. 7. Each wheel well 32 and 34 has an elongated axle channel 48 and 50 associated therewith, which is formed in the base portion 14 aligned with the central axis thereof, as best seen in FIG. 2. More particularly, each axle channel 48, 50 opens through the lower surface 18 of the base portion 14, and includes an enclosed hub area 52, 54 projecting upwardly from the upper surface 16 of the base portion 12, as shown in FIG. 7.

Figure 3:
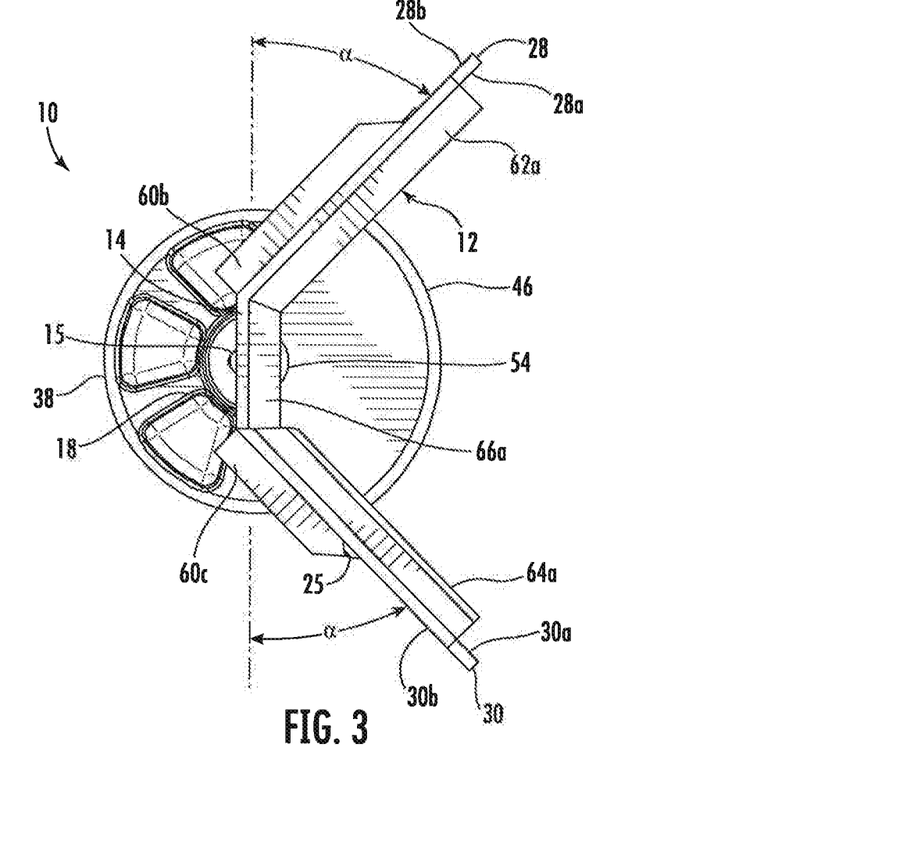
FIG. 3 is a side elevational view of the wheel assembly of FIG. 1.
Figure 4:
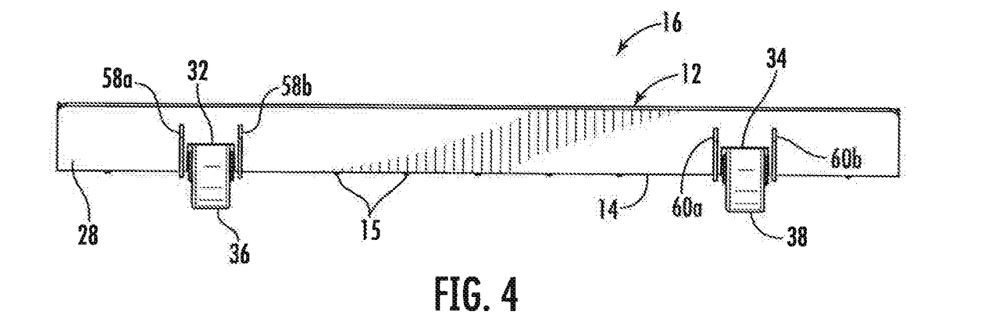
FIG. 4 is a front elevational view of the wheel assembly of FIG. 1.
Figure 5:
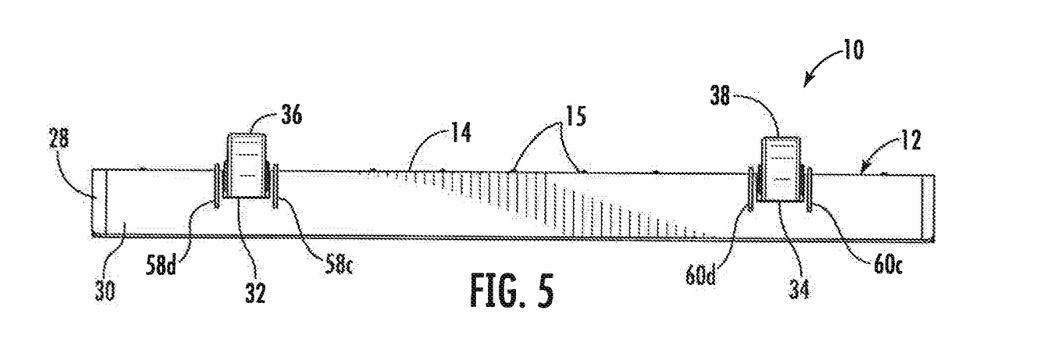
FIG. 5 is a rear elevational view of the wheel assembly of FIG. 1.

Referring to FIGS. 3 and 6, sets of struts extend outwardly from the exterior surfaces 28b and 30b of the front and rear support flange 28 and 30 along peripheral edges of the wheel wells 32 and 34 to protect the wheels 36 and 38 during loading and unloading (e.g., to and from trucks and loading docks) and during use, when transporting the carton over a surface. More particularly, struts 58a-58d surround wheel well 32 to protect wheel 36, and struts 60a-60d surround wheel well 34 to protect wheel 38.

As best seen in FIG. 7, opposed side walls extend from side edges of the interior surfaces 28a and 30a of the front and rear support flanges 28 and 30, and from the upper surface 16 of the base portion 14 along the side edges thereof to prevent the shield 12 from moving or shifting from side-to-side within the bottom rear corner edge portion a carton, as discussed in more detail below. More particularly, the front support flange 28 of shield 12 has opposed side walls 62a and 62b extending from its interior surface 28a, the rear support flange 30 of shield 12 has opposed side walls 64a and 64b extending from its interior surface 30a, and the base portion 14 of shield 12 has opposed side walls 66a and 66b extending from its upper surface 16.

As best seen in FIGS. 3 and 6, the lower surface 18 of the base portion 14 of shield 12 and the exterior surface 30b of the rear flange 30 have a plurality of axially aligned nubs or protuberance formed thereon which are designed to engage or otherwise penetrate into the cardboard surfaces that form the panels of bottom rear corner edge portion of a carton in which it is installed. More particularly, a plurality of rounded nubs 15 project outwardly from the lower surface 18 of the base portion 14 of shield 12, and a plurality of rounded nubs 25 project from the exterior surface 30b of the rear support flange 30 of shield 12. Preferably, the rounded nubs 15 and 25 each have a radial height of about 1/16th of an inch.

Figure 8:
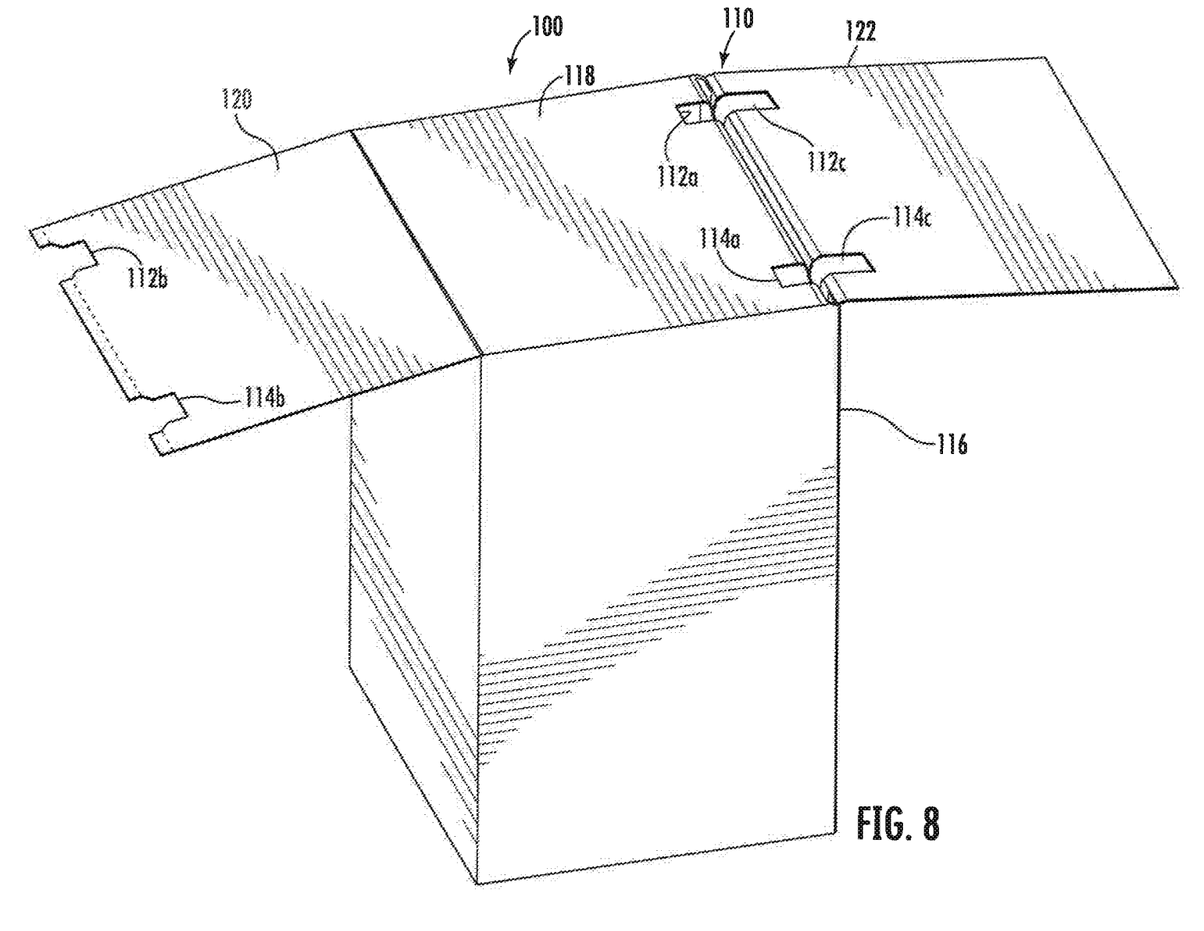
FIG. 8 is a perspective view of a transportable mattress carton or the like in an inverted position, prior to installation of the wheel assembly of FIG. 1, with the first bottom panel in a closed position, and wherein the second and third bottom panels folded open.

Referring now to FIGS. 8 through 11, as mentioned above, the wheel assembly 10 of the subject invention is adapted and configured for installation in a transportable corrugated cardboard carton 100, which defines in pertinent part a bottom rear corner edge portion 110. Referring initially to FIG. 8, the carton 100 is illustrated in an inverted position, and it includes, among other structural features, a rear panel 116 having a height that exceeds the width of the carton 100, a first bottom panel 118 that includes wheel apertures 112a and 114a, a second bottom panel 120 that includes wheel apertures 112b and 114b, and a third bottom panel 122 that includes wheel apertures 112c and 114c.

Figure 9:
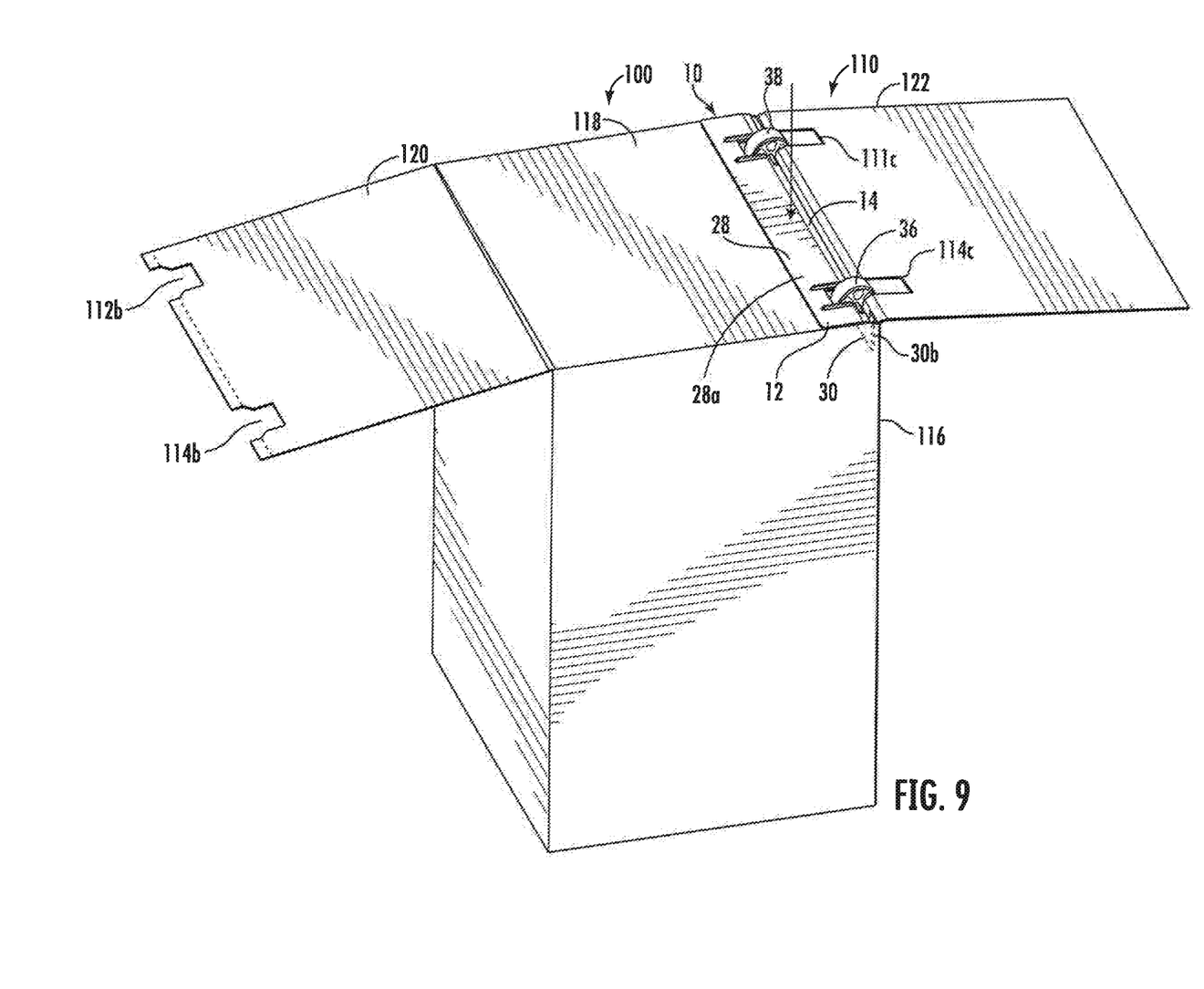
FIG. 9 is a perspective view of the transportable mattress carton, in an inverted position as in FIG. 8, with the wheel assembly of FIG. 1 installed in the bottom corner edge portion of the carton.

To construct or otherwise assemble the transportable carton 100, the wheel assembly 10 is initially positioned in the bottom rear corner edge portion 110 in the manner illustrated in FIG. 9. That is, the wheel assembly 10 is inserted into the corner of the carton in such a manner so that the exterior surface 30b of the rear support flange 30 of shield 12 is positioned against an interior surface of the rear panel 116 of carton 100, and the interior surface 28a of the front support flange 28 of shield 12 is positioned against an exterior surface of a first bottom panel 118 of carton 100.

Figure 10:
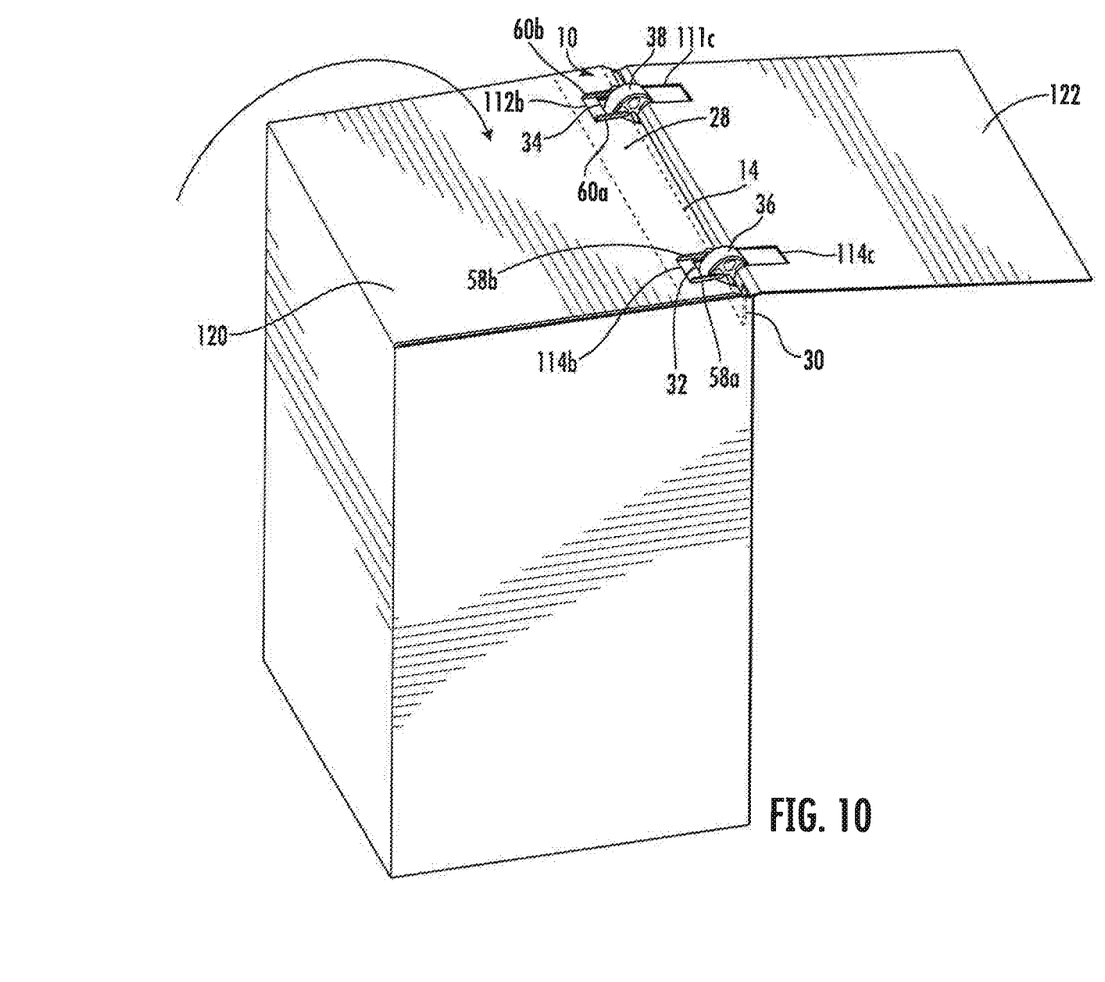
FIG. 10 is a perspective view of the transportable mattress carton, in an inverted position as in FIG. 9, with the second bottom panel folded over the first bottom panel and the wheel assembly.

Then, a second bottom panel 120 of the carton 100 is folded over the exterior surface 28a of the front support flange 28 of shield 12 and the first bottom panel 118 of the carton 100, as depicted in FIG. 10. At such a time, the apertures 112b and 114b engage the struts 58a, 58b and 60a, 60b surrounding the wheel hubs 32 and 34, respectively, to help prevent the wheel assembly 10 from moving side-to-side within the carton 10.

Figure 11:
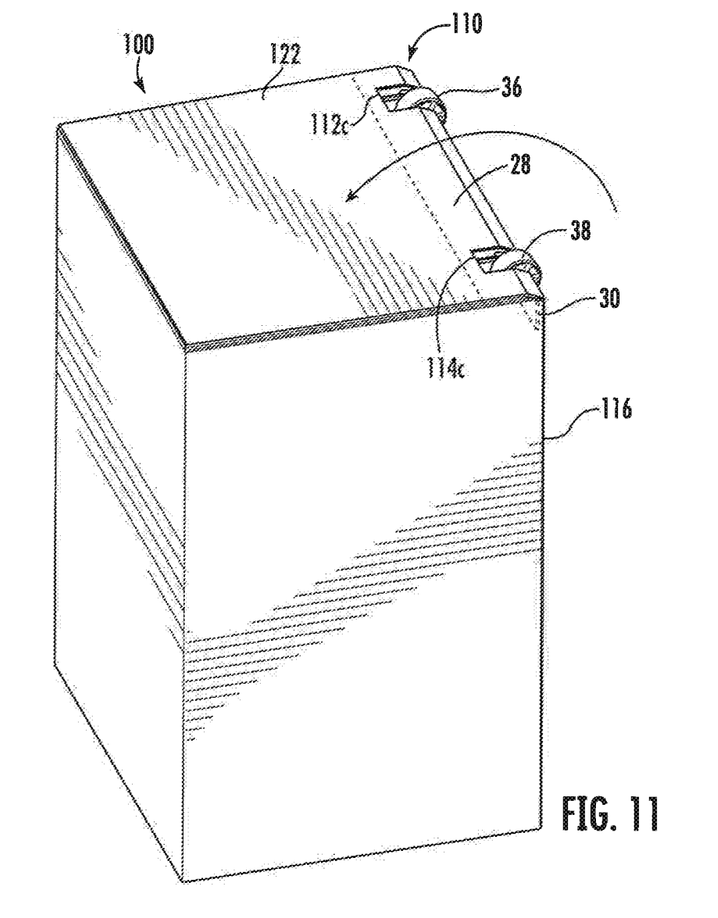
FIG. 11 is a perspective view of the transportable mattress carton, in an inverted position as in FIG. 10, with the third bottom panel folded over the second bottom panel, and wherein the wheels of the wheel assembly extend through the aperture defined in the bottom corner edge portion of the carton and the wheel assembly.

Thereafter, as depicted in FIG. 11, the third bottom panel 122 of the carton 100, which is attached to the rear panel 116, is folded over an exterior surface of the second bottom panel 120 of the carton 100 so as to firmly retain the shield assembly 10 within the bottom rear corner edge portion 110 of the carton 100. At such a time, the spaced apertures 112c and 114c of the third bottom panel 122 are aligned with the spaced apart apertures 112b and 114b of the second panel 120, and the spaced apart apertures 112a and 114a of the first bottom panel 118.

Figure 12:
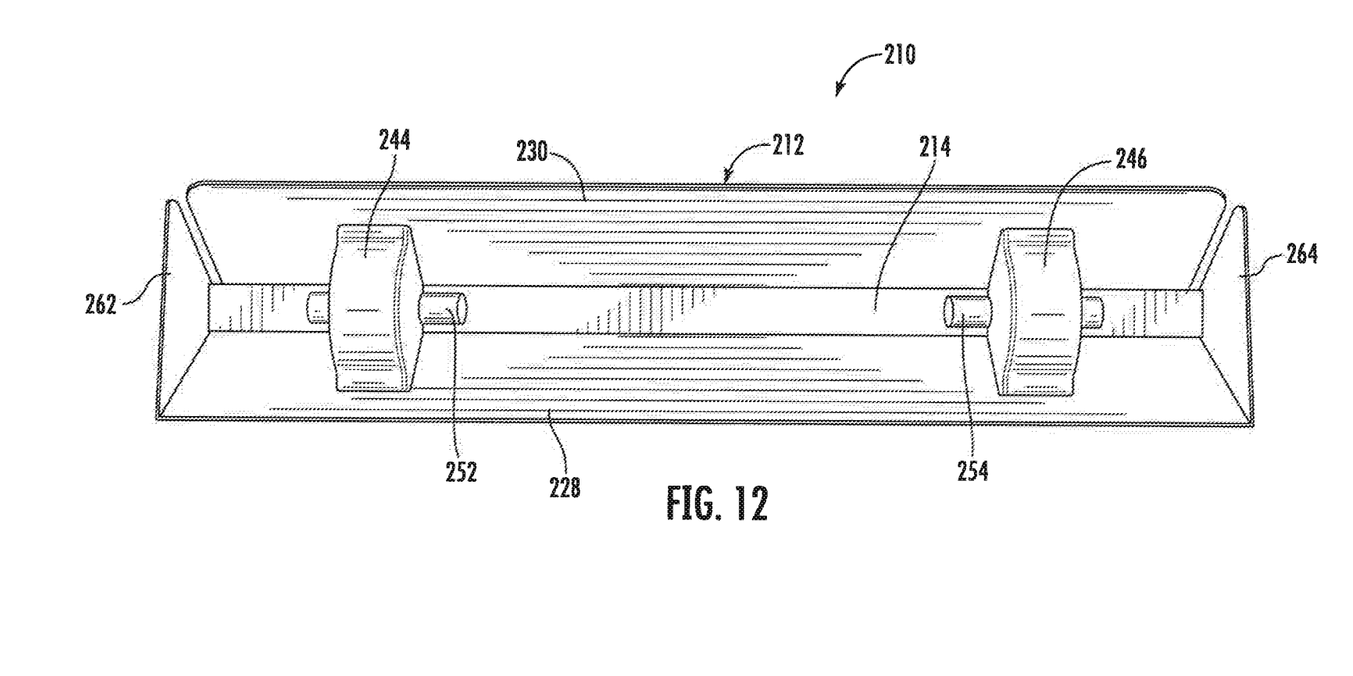
FIG. 12 is an illustration of another preferred embodiment of the wheel assembly the subject invention, as viewed from a top perspective.
Figure 13:
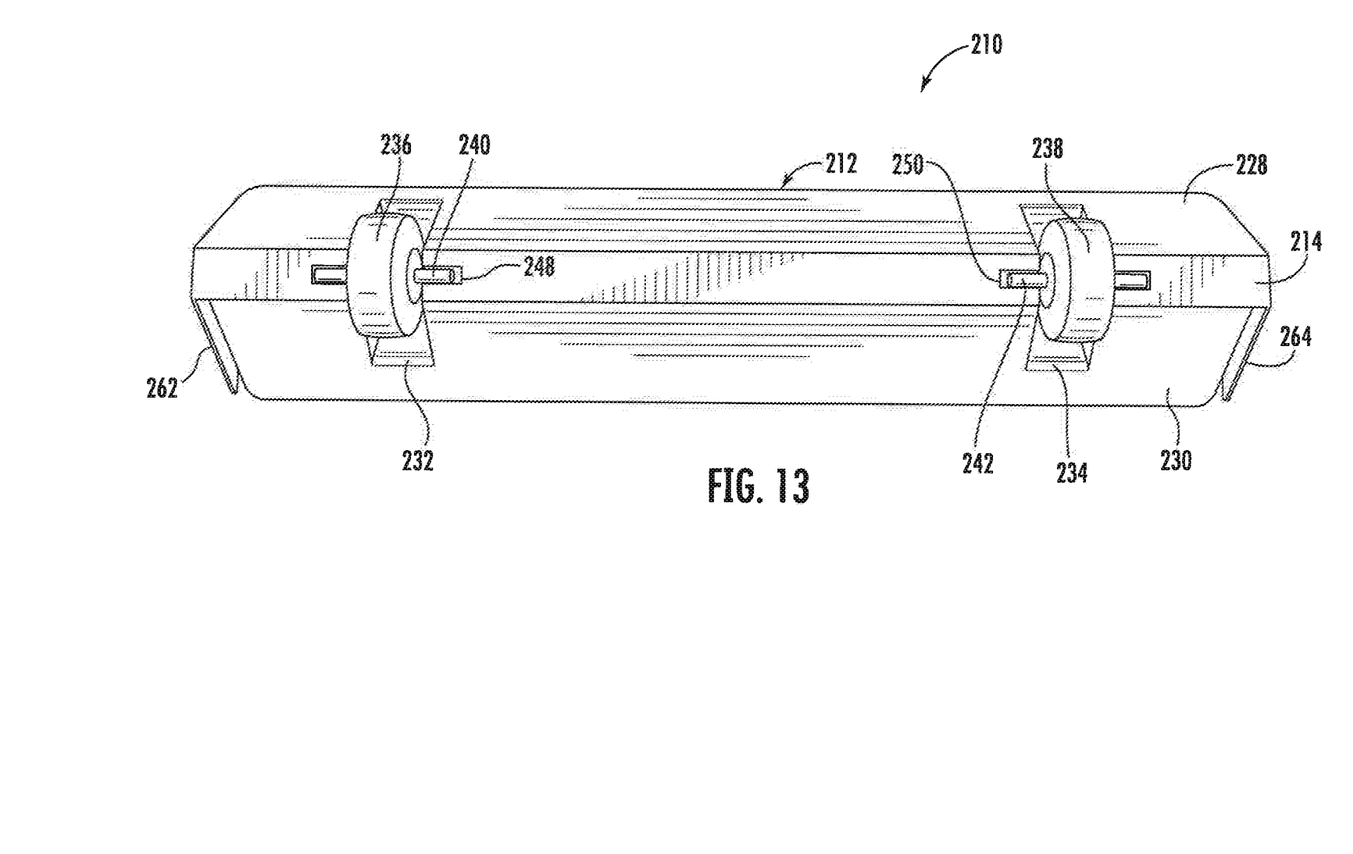
FIG. 13 is an illustration of the wheel assembly show in FIG. 12, as viewed from a bottom perspective.
Figure 14:
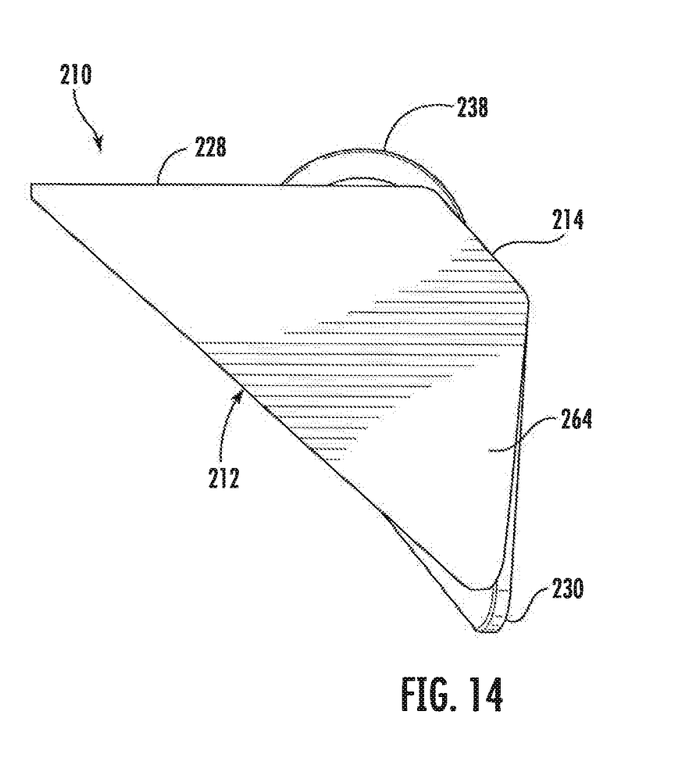
FIG. 14 is side elevational view of the wheel assembly shown in FIG. 12.

Referring now to FIGS. 12 through 14, there is illustrated another preferred embodiment of the wheel assembly the subject invention, which is designated generally by reference numeral 210. The wheel assembly 210 includes an elongated injection molded thermoplastic shield 212. The shield 212 of wheel assembly 210 has a planar base portion 214, a front support flange 228 and a rear support flange 230. The rear support flange 230 is narrower than the front support flange 228, and opposed side walls 262 and 264 are formed with the front support flange 228, as shown for example in FIG. 14. The opposed front and rear support flanges 228 and 230 extends upwardly from the base portion 214 at opposed angles to one another to conform with the bottom rear corner edge portion of a carton, as described above with regard to wheel assembly 10.

As best seen in FIG. 13, the shield 212 includes longitudinally spaced apart wheel wells 232 and 234, which include axle channels 248 and 250, respectively. Wheel 236 on axle 240 is accommodated within wheel well 232 and axle channel 248, and wheel 238 on axle 242 is accommodated within wheel well 234 and axle channel 250. As best seen in FIG. 12, an arcuate wheel housing 244 and enclosed hub area 252 are associated with wheel well 232 and axle channel 248, and an arcuate wheel housing 246 and enclosed hub area 245 are associated with wheel well 234 and axle channel 250.

While the subject disclosure has been shown and described with reference to preferred embodiments, those skilled in the art will appreciate that changes and/or modifications may be made thereto without departing from the scope of the subject disclosure. For example, although the carton disclosed herein is configured to transport a mattress in a compressed and rolled state, those skilled in the art will appreciate that the carton can be configured to enable retail customers to easily transport other relatively large and heavy products purchased in retail stores, such as home furniture and appliances.

What is claimed is:

1. A wheel assembly for a transportable carton, comprising:
   a) an elongated shield having a planar base portion defining upper and lower surfaces, opposed front and rear edges, opposed side edges and a central axis, and a pair of support flanges extending upwardly from the opposed front and rear edges of the base portion at opposed angles to one another relative to the upper surface of the base portion, each support flange having a respective interior and exterior surface; and
   b) a pair of longitudinally spaced apart wheel wells formed within the shield, wherein each wheel well is adapted and configured to accommodate a respective wheel mounted on an axle, and wherein struts extend outwardly from the exterior surfaces of each support flange along peripheral edges of the wheel wells formed therein.

2. A wheel assembly as recited in claim 1, wherein each support flange extends upwardly from a respective edge of the base portion at an angle of about between 40 and 45 degrees relative to the upper surface of the base portion.

3. A wheel assembly as recited in claim 1, wherein the pair of support flanges includes a front support flange extending upwardly at an angle from the front edge of the base portion and a rear support flange extending upwardly at an angle from the rear edge of the base portion.

4. A wheel assembly as recited in claim 3, wherein the front support flange is wider than the rear support flange.

5. A wheel assembly as recited in claim 3, wherein the lower surface of the base portion and the exterior surface of rear support flange includes a plurality of spaced apart outwardly projecting rounded nubs.

6. A wheel assembly as recited in claim 1, wherein each wheel well has an arcuate wheel housing associated therewith that extends between the respective interior surfaces of the support flanges.

7. A wheel assembly as recited in claim 1, wherein each wheel well has an elongated axle channel associated therewith, which is formed in the base portion aligned with the central axis thereof.

8. A wheel assembly as recited in claim 7, wherein each axle channel opens through the lower surface of the base portion, and includes an enclosed hub area projecting upwardly from the upper surface of the base portion.

9. A wheel assembly as recited in claim 1, wherein opposed side walls extend from side edges of the interior surfaces of each support flange and from the upper surface the base portion along the side edges thereof.

10. A wheel assembly as recited in claim 1, wherein a wheel mounted on an axle is accommodated within each of the wheel wells.

\* \* \* \* \*